(12) United States Patent
Kato et al.

(10) Patent No.: US 12,035,006 B2
(45) Date of Patent: Jul. 9, 2024

(54) ELECTRONIC APPARATUS HAVING NOTIFICATION FUNCTION, AND CONTROL METHOD FOR ELECTRONIC APPARATUS

(71) Applicants: Hisense Visual Technology Co., Ltd., Shandong (CN); TVS REGZA Corporation, Misawa (JP)

(72) Inventors: Masaya Kato, Misawa (JP); Kazuyuki Okano, Misawa (JP)

(73) Assignees: HISENSE VISUAL TECHNOLOGY CO., LTD., Shandong (CN); TVS REGZA CORPORATION, Misawa (JP)

( * ) Notice: Subject to any disclaimer, the term of this patent is extended or adjusted under 35 U.S.C. 154(b) by 225 days.

(21) Appl. No.: 17/644,479

(22) Filed: Dec. 15, 2021

(65) Prior Publication Data

US 2022/0109914 A1    Apr. 7, 2022

Related U.S. Application Data

(63) Continuation of application No. PCT/CN2020/105570, filed on Jul. 29, 2020.

(30) Foreign Application Priority Data

Jul. 31, 2019    (JP) .................................. 2019-141478

(51) Int. Cl.
*H04N 21/458*    (2011.01)
*G06F 3/16*    (2006.01)
(Continued)

(52) U.S. Cl.
CPC ......... *H04N 21/4583* (2013.01); *G06F 3/165* (2013.01); *H04N 21/42203* (2013.01); *H04N 21/4334* (2013.01)

(58) Field of Classification Search
CPC ......... H04N 21/4583; H04N 21/42203; H04N 21/4334; G06F 3/165
(Continued)

(56) References Cited

U.S. PATENT DOCUMENTS

2004/0049788 A1   3/2004   Mori et al.
2009/0175593 A1   7/2009   Hayakawa
(Continued)

FOREIGN PATENT DOCUMENTS

CN    1535534 A    10/2004
CN    1833437 A    9/2006
(Continued)

OTHER PUBLICATIONS

International Search Report, dated Oct. 20, 2020, for PCT/CN2020/105570 filed Jul. 29, 2020.
(Continued)

*Primary Examiner* — Girumsew Wendmagegn
(74) *Attorney, Agent, or Firm* — Workman Nydegger

(57) ABSTRACT

Disclosed are an electronic apparatus having a notification function, and a control method for the electronic apparatus. The electronic apparatus has the notification function of definitely notifying a user of a target notification sound that is different from a sound associated with a broadcast program currently being watched. The electronic apparatus includes: a schedule generation element, configured to use view data and program data of a program watched in a receiving apparatus to generate, according to the result of preference information analysis, a schedule including information of a recommended program that is recommended to the receiving apparatus and a broadcast start time of the recommended program; and a schedule control element, configured to output, based on the schedule, a notification signal before the broadcast start time of the recommended
(Continued)

program, the schedule control element controls, based on the notification signal, a notification speaker used for outputting a notification sound.

14 Claims, 12 Drawing Sheets

(51) Int. Cl.
*H04N 21/422* (2011.01)
*H04N 21/433* (2011.01)

(58) Field of Classification Search
USPC .......................................................... 386/293
See application file for complete search history.

(56) References Cited

U.S. PATENT DOCUMENTS

| | | | |
|---|---|---|---|
| 2012/0246680 A1 | 9/2012 | Hirota et al. | |
| 2015/0281891 A1 | 10/2015 | Umetani et al. | |
| 2016/0088359 A1 | 3/2016 | Vaidhyanathan et al. | |
| 2017/0064412 A1 | 3/2017 | Taxier | |
| 2017/0374426 A1* | 12/2017 | Wang | H04N 21/25891 |

FOREIGN PATENT DOCUMENTS

| | | | |
|---|---|---|---|
| CN | 102668590 A | | 9/2012 |
| CN | 103747291 A | | 4/2014 |
| JP | H1198425 A | * | 4/1999 |
| JP | H1198425 A | | 4/1999 |
| JP | 2001036846 A | * | 2/2001 |
| JP | 2001111441 A | | 4/2001 |
| JP | 2003219332 A | | 7/2003 |
| JP | 2006339856 A | | 12/2006 |
| JP | 2007295383 A | | 11/2007 |
| JP | 2008187576 A | | 8/2008 |
| JP | 2010016635 A | | 1/2010 |
| JP | 2014502454 A | | 1/2014 |
| JP | 2015115879 A | | 6/2015 |
| JP | 6463545 B1 | | 1/2019 |
| KR | 20060073071 A | | 6/2006 |
| WO | 2008129879 A1 | | 7/2010 |

OTHER PUBLICATIONS

Chinese Office Action, dated May 5, 2022, from Chinese App. No. 202080004650.7.
Chinese Office Action, dated Dec. 5, 2022, from Chinese App. No. 202080004650.7.
Japanese Office Action, dated Sep. 16, 2022, from Japanese App. No. 2019-141478.
Japanese Search Report, dated Jul. 22, 2022, from Japanese App. No. 2019-141478.

* cited by examiner

ELECTRONIC APPARATUS HAVING NOTIFICATION FUNCTION, AND CONTROL METHOD FOR ELECTRONIC APPARATUS

This application is a continuation of International Application No. PCT/CN2020/105570 filed Jul. 29, 2020, which claims priority to the Japanese Patent Application No. 2019-141478, filed on Jul. 31, 2019 and entitled "ELECTRONIC APPARATUS HAVING NOTIFICATION FUNCTION, AND CONTROL METHOD FOR ELECTRONIC APPARATUS", the entire contents of which are incorporated herein by reference.

FIELD

The present embodiments relate to an electronic apparatus having a notification function, and a control method for the electronic apparatus, for example, an apparatus acting in association with a television apparatus.

BACKGROUND

A television apparatus having following functions is developed. When a time period for a user to start a preferred program in accordance with the user's preference is reached, the television apparatus can notify the user who is watching a program that the preferred program (or a recommended program) of the user starts, by a sound or on a display.

When the user notices the notification based on the notification function, the user can perform a video recording operation on the television apparatus or switch channels to prepare for watching. Thus, the user will not forget to record the preferred program, or forget to watch the preferred program.

SUMMARY

The embodiments of the present disclosure are directed to an electronic apparatus having a notification function of definitely notifying a user of a target notification sound different from a sound associated with a broadcast program currently being watched and a control method for the electronic apparatus.

In the embodiments of the present disclosure, an electronic apparatus having a notification function is provided. The electronic apparatus includes: a schedule generation element, configured to generate a schedule including a broadcast start time of a recommended program, where the recommended program is obtained by using watching data of a program watched in a receiving apparatus and is recommended to the receiving apparatus; a schedule control element, configured to generate, based on the schedule, a notification signal corresponding to the broadcast start time of the recommended program; and a sound control element, configured to control output of a notification sound in a manner of separation from a watching sound, based on output of the watching sound for program watching and the notification signal.

DESCRIPTION OF REFERENCE NUMERALS

100. television apparatus, 101. tuner, 102. demultiplexer, 103. video decoder, 104. display, 105. audio decoder, 106. speaker system, 131. internet communication element, 141. view data collection element, 142. program data collection element, 143. preference information parsing element, 144. schedule generation element, 145. schedule control element, 146. sound control element, 147. sound recognition element, 149. television control element, 600. AI interface device, 400. server, 401. data processing element, 403. view data collection element, 404. program data collection element, 405. preference information parsing element, 411. schedule generation element, 412. schedule control element.

DETAILED DESCRIPTION OF THE EMBODIMENTS

Hereinafter, the embodiments will be described with reference to the drawings.

Figure 1:
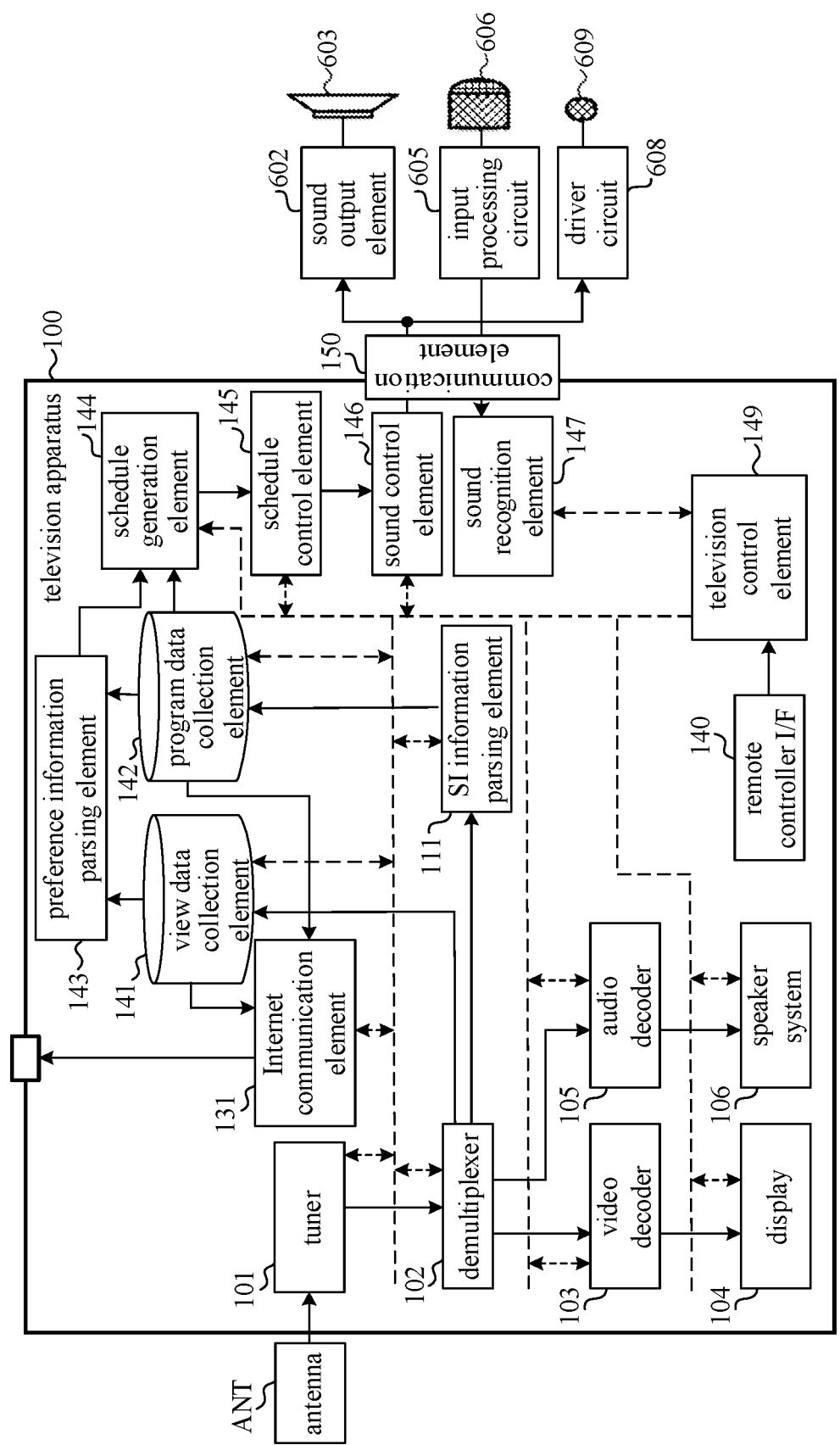
FIG. 1 is a diagram illustrating a structure of an embodiment.

FIG. 1 is a diagram illustrating an embodiment. 100 denotes a television apparatus. A broadcast signal received by an antenna is input to a tuner 101. The tuner 101 selects a channel selected by a user from the broadcast signal, demodulates a signal of the selected channel, and supplies a program stream to a demultiplexer 102. The tuner 101 simultaneously receive multiple channels, and selectively receives/demodulates 2K terrestrial wave digital broadcast signals, 4K/8K satellite broadcast signals, and the like.

A video stream separated by the demultiplexer 102 is decoded by a video decoder 103 to display images on a display 104. An audio stream separated by the demultiplexer 102 is decoded by an audio decoder 105 and input to a speaker system 106 for output as an audio signal. The speaker system 106 employs double channels or employs any one of a variety of ways such as 5.1 multi-channel stereo, 7.1 multi-channel stereo, 22.2 multi-channel stereo.

The user performs channel selection on the television apparatus 100 by operating a remote controller, for example. That is, when the user operates the remote controller, an instruction signal is recognized by a television control element 149 via a remote controller interface (I/F) 140. The television control element 149 cooperatively controls each function block in the television apparatus 100. A line of a control signal output from the television control element 149 is denoted by a dashed line. It will be appreciated that the present system is capable of realizing channel selection or the like by sound instructions, as will be described later.

Program-related control signals, program information, and the like separated from the program stream in the demultiplexer 102 are separated in an SI information parsing element 111. In addition, program view history generated based on the channel selection or program selection information indicated by the television control element 149 is collected by a view data collection element 141.

However, even if a channel is selected to play a program, whether the user watches the program or not is determined according to, for example, a continuous play time. For example, while the program is continuously playing for more than 5 minutes, it is determined that the user has watched the program.

In a case where the program has been watched, program data of the corresponding program is accumulated in a program data collection element 142. The program data includes a channel, actor, type, broadcasting period, and the like of the program. It should be noted that when the program is watched, the program is not limited to a program broadcast in real-time, for example, a program played from a storage medium such as an automatic recording device or a hard disk drive (HDD) that is otherwise connected may be included in view data (not illustrated). The program data in this case is collected, for example, according to metadata recorded in a storage medium in which the program is played.

The view history of the view data collection element 141 and the program data of the program data collection element 142 described above are used for the parsing in a preference information parsing element 143. As the view history, one week or two weeks are utilized as a unit, for example. Weekly preference information (indicating the preference tendency) is checked, for example, in such a way that the preference tendency of programs of one week are parsed by using the view history of this week and the preference tendency of programs of a next week are parsed by using the view history of the next week, the preference information for each week is accumulated for several weeks, therefore, the weight of preference degree is obtained for all the programs watched by the user.

In this way, the user's preference related to the program can be learned. That is, it is possible to obtain an analysis result of a user who watches a program through the television apparatus 100, which has a view tendency to watch certain programs.

The labeling method of the analysis method and the analysis result may be various, and is not particularly limited here. For example, there are methods such as the following: for preference information indicating the preference tendency, actors, producers, writers, or the like is taken as factors (aspects) to determine the preference tendency of a user (programs that the user may be interested in), the category (TV series, episodes, sports, funny programs, mystery series, etc.) is used as factors to determine the preference tendency of a user (programs that the user may be interested in) or the above methods are combined to determine the preference tendency of a user (programs that the user may be interested in).

The preference information parsing element 143 parses and determines multiple programs with preference tendency of the user. The preference information parsing element 143, for example, determines the user's preference degree according to a length of the user's view time of the program, the number of the user's view times (the number of views of the series of programs), and the like, ranks the multiple programs, and generates, for example, preference information according to top-ten programs. In this way, the preference information parsing element 143 parses so-called view tendencies, such as a user that often watches as long as the type is sports and the team name is "Jeff" or a user that often watches when the type is TV series and "Jack" plays as an actor, and generates preference information or preference data of the view tendencies.

The preference information parsing element 143 retrieves, from the program data collection element 142, whether or not there are other programs having program information which can be used to generate the same preference tendency data as described above. The retrieved program becomes a recommended program that will be a target program for schedule.

After the recommended program is determined, the schedule generation element 144 takes a channel, a broadcasting time (a start time or an end time), program name information, and the like of the recommended program from the program data collection element 142, and makes a table in which programs are arranged in sequence from the program near the start time (program starting right away), for example. In addition, keywords (e.g., action, trip, field, etc.) upon which a decision for a recommended program is based may also be stored in association with the recommended program in the table.

The schedule control element 145 frequently checks data within the schedule generation element 144. The schedule control element 145 transmits a notification signal to a sound control element 146 when the start time of the recommended program is coming. The sound control element 146 sends a notification signal to a sound output element 602 via an interface, such as a communication element 150. Therefore, a speaker 603 provides a notification sound so that the user is able to know that the start time of the recommended program is close. In particular, in the present embodiment, the notification speaker 603 that outputs a notification sound is arranged in a place different from that of the speaker system 106 for program sound output (watching). The sound output element 602 and the notification speaker 603 are configured as one speaker component and can be connected to the television apparatus 100 by a wire, or can be connected to the television apparatus 100 by a short-range wireless or infrared way, such as Wi-Fi (registered trademark) or Bluetooth (registered trademark). In this case, the user is not necessarily required to watch the television apparatus 100 in front of the television apparatus 100, and the user is free to move the speaker component to the kitchen, bedroom, or the like, and places the speaker in a place where the notification sound is easily heard.

A microphone component formed by a microphone 606 and an input processing circuit 605 may be incorporated into the above speaker component. Alternatively, a sound signal input from the microphone 606 may be recognized by a sound recognition element 147 via the communication element 150 to act as a sound instruction signal. That is, channel switching, start/stop of video recording, output control of the speaker system 106, and the like may also be configured to be operated by a sound instruction signal.

As described above, the notification speaker 603 outputs a notification sound, but in addition to the notification sound, the user may be notified by a light emitting element such as an LED element or by a light emitting element such as an LED element alone. It should be noted that in this case, the sound control element 146 not only performs sound control but is also designed to include an LED blinker control element. Notification based on a notification sound, notification with light (e.g., blinkering), or both can be performed in advance in the television control element 149.

The notification sound may be in various forms. For example, it may be a simple sound like the sound "beep", or it may be a speech with a meaning like "the recommend program is about to start". In addition, for the notification sound, the user may also preset a preference "notification sound". Furthermore, a function of converting keywords which are used to determine a recommended program, such as an actor, a character name, a program name, and the like, into a sound signal may be provided.

Figure 2:
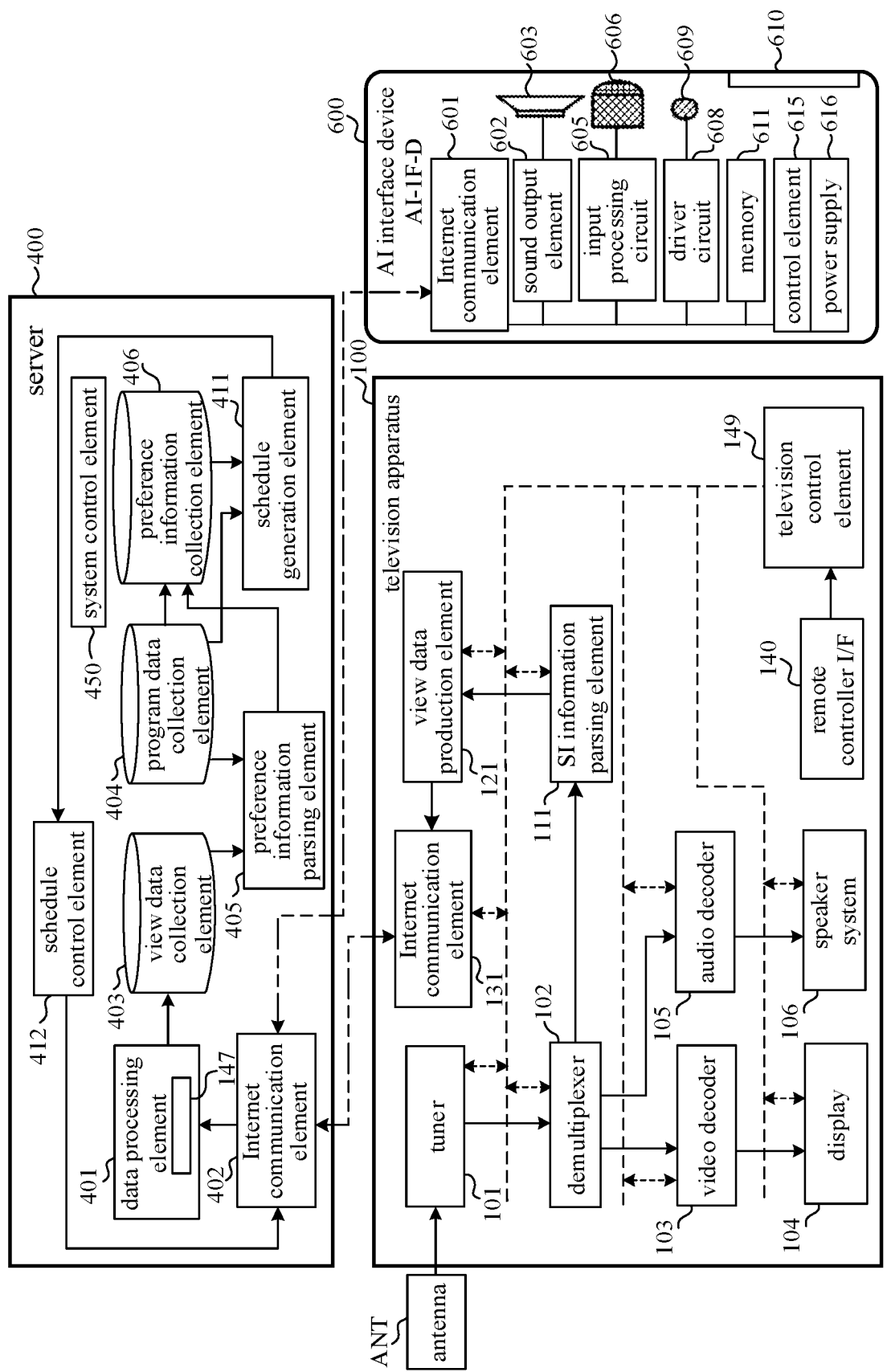
FIG. 2 is a diagram illustrating a structure of another embodiment.

It should be noted that the speaker 603 and the microphone 606 just mentioned may of course be arranged inside an AI interface device (sometimes referred to as a smart speaker or an AI speaker) 600 as illustrated in FIG. 2. In the case of the AI interface device 600, the user is able to input high level instructions.

The AI interface device 600 includes a sound output element 602, a speaker 603, a microphone 606, an input processing circuit 605, an LED element 609, a driver circuit 608 for driving the LED element 609, a control element 615, and a power supply 616 in a housing. The AI interface device 600 further includes an operation element 610 and a memory 611. The operation element 610 is a touch panel operation element capable of performing operation mode switching (user registration, registration mode of a portable device such as a television apparatus or a portable terminal) and sensitivity switching (sound output level, microphone sensitivity, and the like). Various databases can be built in the memory 611.

The user is able to reply to (answer) whether to watch the recommended program when hearing the notification sound. In this case, if the user is near the television apparatus 100, the user may also operate the remote control to answer, and the user may also answer by using the microphone 606. In the case of answering with the microphone 606, the user, for example, says "switch to the . . . channel!", and such speech may serve as a sound instruction. In this way, the sound instruction is recognized by the sound recognition element 147 of the television apparatus 100 and recorded by the television control element 149. The television control element 149 controls the tuner 101 and the demultiplexer 102 in accordance with the sound instruction, and performs program selection corresponding to the sound instruction. Of course, the program at this time is a "recommended program" notified by the notification sound, and the time of selection is the time at which the recommended program starts.

The user can also give an answer like "Don't watch this program today" or "No!" such a "refusal" answer when the user hears the above notification sound to answer. In this case, the television apparatus 100 does not switch channels but maintains the current receiving channel (or the current state). Also as explained later, the user may also not watch the recommended program from now on but issue an instruction to record the recommended program.

The television apparatus 100 includes an internet communication element 131 to transmit view data (view history) to an external server.

In the above-described embodiment, preference information parsing and schedule generation are performed inside the television apparatus 100. However, since the television apparatus 100 is provided with the Internet communication element 131, the preference information parsing, schedule, and the like can be delegated to an external server.

FIG. 2 is a diagram illustrating the structure of another embodiment. An internal structure of the television apparatus 100 and part of the AI interface apparatus 600 similar to that of FIG. 1 are described with the same numerals as those of FIG. 1. In the embodiment of FIG. 2, the view data collection element 141, the program data collection element 142, the preference information parsing element 143, the schedule generation element 144, the schedule control element 145, the sound control element 146, the sound recognition element 147, and the like of FIG. 1 are omitted within the television apparatus 100. Thus, elements of the television apparatus 100 are reduced. In the television apparatus 100, when the television apparatus 100 plays a program, the view data producing element 121 produces view data. The view data is also sometimes referred to as view logs or view history, and the like. For the view data, it is preferred to summarize, for example, one week of view data or two weeks of view data.

The television apparatus 100 transmits the view data to the server 400 via the Internet communication element 131. Alternatively, when the server 400 requests the view data periodically (every week or every two weeks), the view data is sent to the server. Other elements within the television apparatus 100 are substantially the same as FIG. 1, and thus a detailed description is omitted herein.

Next, the server 400 will be described. The server 400 is provided with an Internet communication element 402 and a data processing element 401 that processes data received via the Internet. The data processing element 401 includes the sound recognition element 147 described in FIG. 1. The data processing element 401 inputs view data transmitted from the television apparatus 100 to the view data collection element 403. In addition, the sound recognition element 147 inputs an instruction based on the recognized sound data to the system control element 450.

Furthermore, since data transmitted from the television apparatus 100 also contains identification data of the television apparatus 100 and the like, the data processing element 401 transmits such data to the system control element 450. Thus, the system control element 450 can manage data transmitted from multiple television apparatus. In addition, the system control element 450 can manage data of each individual user associated with the television apparatus, as will be described later.

The server 400 is further provided with a program data collection element 404. The program data is extracted from, for example, SI information acquired from an Internet or a broadcast receiving apparatus (not illustrated), and saved in the program data collection element 404.

In a case where the view data is transmitted from the television apparatus 100, the server 400 saves the view data in the view data collection element 403. The preference information parsing element 405 uses the view data and program data of the program data collection element 404 to parse tendencies (preferences) of watched programs. The data obtained by parsing is preference information (preference data) effective for setting recommended programs (strongly preferred programs) for the television apparatus 100.

The preference data collection element 406 collects preference data obtained by parsing. The preference data collection element 406 can collect preference data of multiple television apparatus that can determine the program preference. In the figure, a television apparatus 100 is connected to the server 400, but in practice multiple television apparatus can be connected to the server 400.

The preference data collection element 406 saves the television apparatus 100 (actually, identification data of the television apparatus 100) in association with a recommended program for the television apparatus 100 (strongly preferred program) and program information thereof (the channel of the recommended program, the broadcasting time (the start time or the end time), the program name, and the like) after the recommended program is determined. In the preference data collection element 406, recommended programs and channels, broadcasting times (the start time or the end time), program names, and the like, respectively recommended to multiple television apparatus, are accumulated.

The schedule generation element 411 makes a schedule (table) where programs are arranged in sequence from the program near the start time for each television apparatus. Further, the keywords upon which the decision of the recommended program is based may also be stored in association with the corresponding recommended programs in the table.

In this case, the schedule is made while referring to the program data collection element 404 and providing, for example, a geographically appropriate broadcasting period. This is because recommended program information may be cut or added, reproduced, corrected, or the like when the geographical area of the television apparatus 100 changes and television identification information includes information of the geographic area of the television apparatus 100.

When the period of the recommended program approaches, the schedule control element 412 notifies the appropriate AI interface device 600 via the Internet communication element 402 that the broadcast start time of the recommended program approaches. The AI interface device 600 at this time includes an Internet communication element 601 that transmits a notification signal to a sound output element 602 if the notification signal is received. Thus, the notification speaker 603 can output a notification sound. The notification sound may be in various forms, as previously explained. The AI interface device 600 includes a sound output element 602, a speaker 603, a microphone 606, an input processing circuit 605, an LED element 609, a driver circuit 608 for driving the LED element 609, a control element 615, and a power supply 616.

The user is able to reply (answer) to whether to watch the recommended program when hearing the notification sound. The user may answer with the microphone 606. The user utilizes the microphone 606 to say, for example, "switch to the . . . channel!", and such speech may serve as a sound instruction. The sound instruction is then recognized by the server 400 by the Internet communication element 601 and the Internet communication element 402. The server 400 can understand a sound instruction by using the sound recognition element 147, and the system control element 450 can perform channel selection indication to the television apparatus 100 via the Internet communication element 402.

It should be noted that in the above example, in order to make the television apparatus 100 select a recommended program to play, the television apparatus 100 receives a program selection instruction signal via the server 400. However, direct reception from the AI interface device 600 may also be designed as shown in FIG. 1.

In the above-described embodiments, a method for utilizing the television apparatus 100 by multiple users within a family is not described. However, the present system may also notify recommended programs by user in a case where the multiple users utilize one television apparatus 100.

In the present system, the AI interface device 600 has a sound registration function for multiple users (e.g., father, mother, child, etc.) within a family. Description is made with respect to the sound registration function.

Figure 3A:
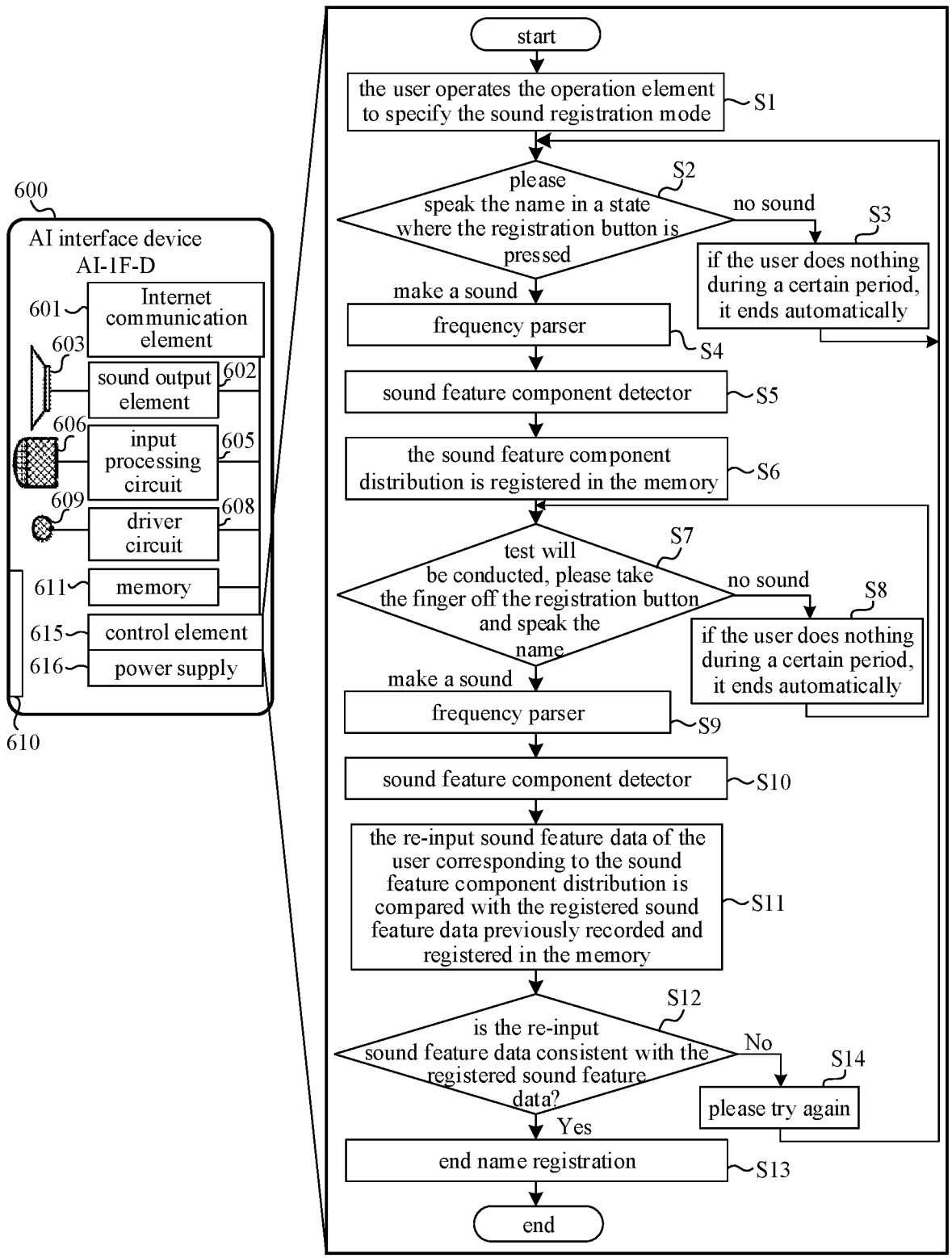
FIG. 3A is a diagram illustrating a structure of an AI interface device and an action example of a part of functions thereof.

As illustrated in FIG. 3A, the control element 615 has an application for sound registration. It should be noted that although the control element 615 is described as having the application, a sound recognizer 147 illustrated in FIG. 1 or provided in the data processing element 401 of FIG. 2 may execute the application. In this case, the sound recognizer 147 and the AI interface device 600 communicate with each other.

Here, the control element 615 is provided with an application for description. Currently, the user operates the operation element 610 to specify the sound registration mode (S1). Then, the AI interface device 600 outputs a sound (S2) from the speaker 603 in such a manner as "please speak the name in a state where the registration button is pressed", for example. However, if the user does nothing during a certain period, it ends automatically (S3).

In a case where the user speaks the name, the user's sound is recorded via the microphone 606. In addition, with respect to the sound data, parsing of the sound frequency is performed by the frequency parser, and based on the parsing result, the detection processing of the sound feature component distribution is performed by the sound feature component detector. Thereby, the sound feature component distribution is registered in the memory 611 as sound feature data of the user (S4~S6).

Next, the AI interface device 600 outputs sound (S7) through the speaker 606, for example, "Test will be conducted. Please take the finger off the registration button and speak the name." However, if the user does nothing during a certain period, it ends automatically (S8).

In a case where the user speaks the name, the user's sound is recorded via the microphone 606. In addition, same as before, with respect to the sound data, parsing of the sound frequency is performed by the frequency parser, and based on the parsing result, the detection processing of the sound feature component distribution is performed by the sound feature component detector (S9, S10). Then, the re-input sound feature data of the user corresponding to the sound feature component distribution is compared with the registered sound feature data previously recorded and registered in the memory 611 (S11, S12).

In a case where the re-input sound feature data is consistent with the registered sound feature data, the AI interface device 600 outputs a sound like "Your name is registered, processing is ended," and ends the processing. In the case where the re-input sound feature data is not consistent with the registered sound feature data, the AI interface device 600 outputs a sound like "please try again" and returns to step S2. It should be noted that in the above description, a scheme for registering a user's name is described, but a nickname may also be registered.

As described above, the present system is capable of pre-registering sound feature data of multiple users in a family. Accordingly, when there are multiple AI interface devices 600 within a family, it is also possible to determine who issues the sound data from each AI interface device 600.

Figure 3B:
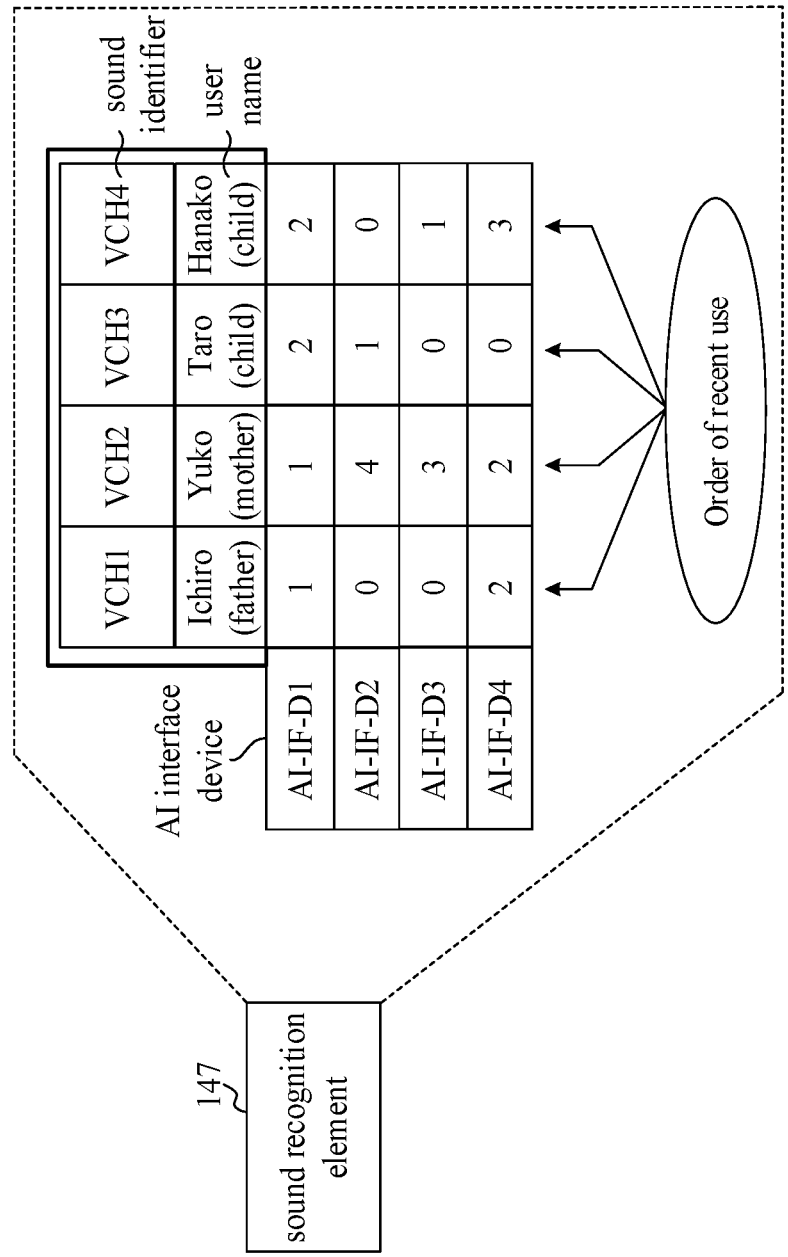
FIG. 3B is a diagram illustrating an example of a database built in a sound recognition element or a server.

FIG. 3B is a diagram for illustrating an effect in a case where register sound feature data of multiple members within a family can be recognized as described above. Since the sound feature data of the user can be registered in the sound recognition element 147, sound identifiers (VCH1, VCH2, VCH3, VCH4 in the example of the drawing) can be assigned to each sound feature data. Besides, the names of the members within the family (in the example of the figure, the names are Ichiro, Yuko, Taro and Hanako), which are actually the vocalization data of the names, can also be registered in correspondence with the sound identifiers. Thus, if the identification number of the user is specified and the name sound button is operated to play the sound data, the name of the member within the family (Ichiro, Yuko, Taro and Hanako) can be output in the form of sound from the speaker 603.

Furthermore, there is a case where multiple AI interface devices AI-IF-D1, AI-IF-D2, AI-IF-D3, AI-IF-D4, . . . are used within the family. In this case, in the present system, for example, a table such as that illustrated in FIG. 3B is created within the sound recognition element 147. That is, an identifier is configured for each user in the horizontal direction, and each AI interface device AI-IF-D1, AI-IF-D2, AI-IF-D3, AI-IF-D4, . . . is configured in the vertical direction. Also, it can be known which AI interface device the user has recently used (the speech takes place near which device). That is, the location information of each member (the residence in which each member was last located) can be managed and tracked via the interface device.

As illustrated by the example in the figure, for example, in the case of "Ichiro (father)", "Ichiro (father)" is recently identified by the AI interface device AI-IF-D1 (recent location information=1) and previously identified by AI-IF-D4 (recent location information=2). However, in the AI interface devices AI-IF-D2, AI-IF-D3, no "Ichiro (father)" is identified (recent locality information=0). It should be noted that in this system, the following design is adopted: besides the location information of the AI interface device AI-IF-D1 (the device with the recent location information=1) that has recently identified "Ichiro (father)", other location information (stay information) is changed to "recent location information=0", if, for example, 8 hours or more has passed. When new location information (=1) is detected by one of the AI interface devices AI-IF-D1, AI-IF-D2, AI-IF-D3, AI-IF-D4, . . . , the location information of the other AI interface devices is updated in a backward moving manner. That is, the server 400 or the sound recognition element 147 can manage the residence in which each member was last located, and thus, the server 400 or the sound recognition element 147 can reliably notify the member who wants to be notified of the above-described notification signal.

In this way, in a case where the user can be recognized, the server 400 or the sound recognition element 147 can construct the view history per user as described below. Also, the server 400 or the sound recognition element 147 can create preference data per user and do schedule management per "recommended program" per user. In addition, the server 400 or the sound recognition element 147 can recognize who has recently used the AI interface devices AI-IF-D1, AI-IF-D2, AI-IF-D3, AI-IF-D4, . . . when notifying the user (Ichiro, Yuko, Taro and Hanako) of the "recommended program", and thus can reliably notify the user who wants to be notified (a recently used AI interface device) of the "recommended program".

Figure 4:
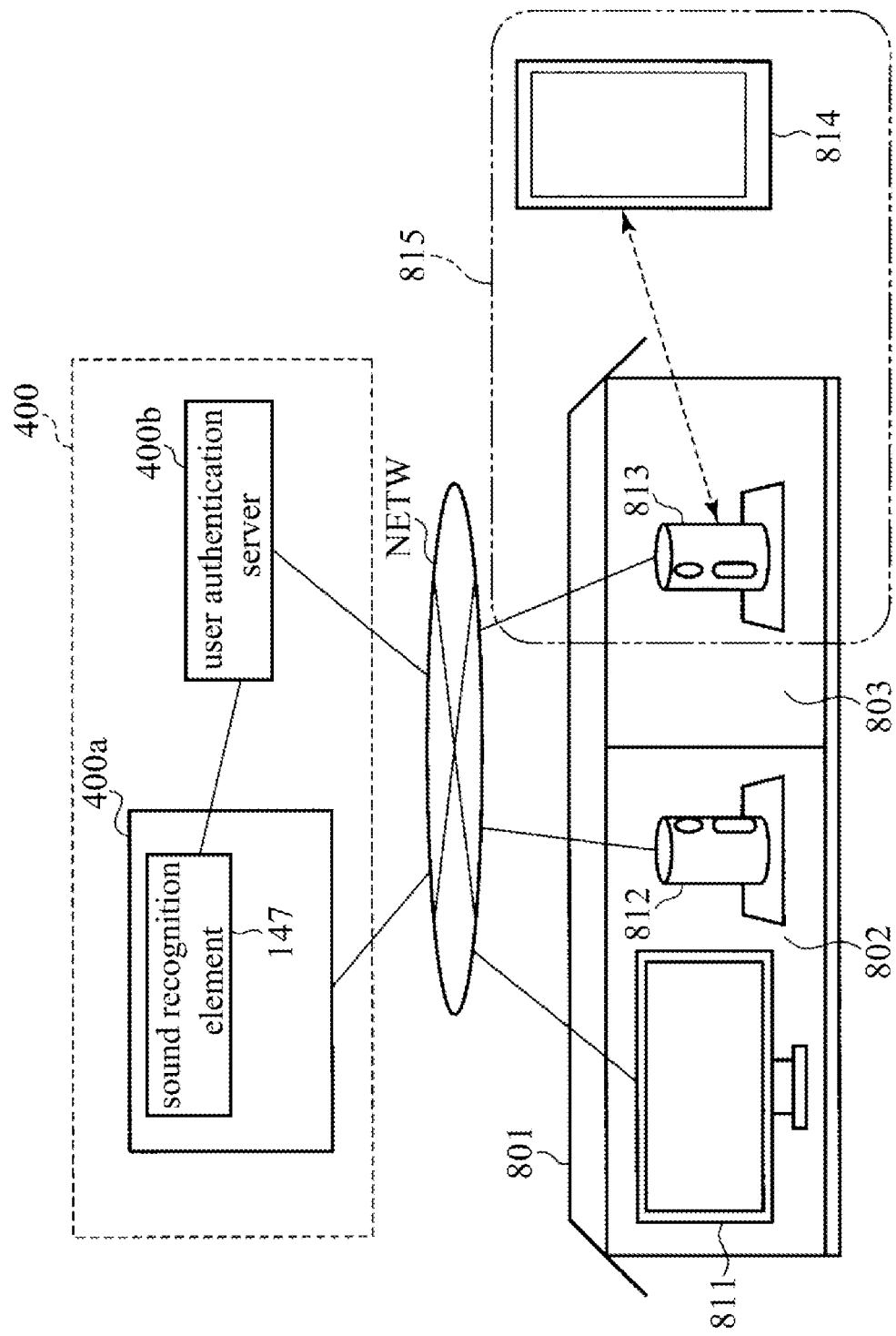
FIG. 4 is a structure description diagram showing another embodiment.

FIG. 4 is a diagram for illustrating a system that definitely notifies a member who wants to be notified of a notification signal when a table described above (the table shown in FIG. 3B) is built. The server 400a includes a sound recognition element 147 in which the above-described table is built (as illustrated in FIG. 3B). The server 400a cooperates with a user authentication server 400b for enrolling AI interface devices, smartphones, and the like. It should be noted that the server 400a and the server 400b may be different servers. Furthermore, the sound recognition element 147 may be arranged in the server 400b.

The user authentication server 400b is a server which can be logged in by a user who newly purchases a smartphone or an AI interface device and acquires an account. The AI interface device logs into the user authentication server 400b, whereby the AI interface device is able to receive various services provided via a network. Thus, the user authentication server 400b separately authenticates and manages the AI interface devices 812, 813 and has data for communication.

It should be noted that the sound recognition element 147 and the user authentication server 400b are illustrated separately in the drawing, but they may be arranged in a single piece.

As described above, the server 400 is able to identify the desired AI interface devices 812, 813. Accordingly, as required, the server 400 is able to selectively designate AI interface devices 812, 813, which need to transmit a notification signal, with reference to the table illustrated in FIG. 3B.

In addition, the server 400 may transmit a notification signal to an AI interface device determined to be the nearest one to a predetermined user when notifying the start of a "recommended program" to the predetermined user with reference to the nearest location information described in FIG. 3A.

Furthermore, there is also a case where, for example, the smartphone 814 is set to log in to the server 400 via the AI interface device 813. In this case, if it is the present system, a notification signal is transmitted to the AI interface device 813, but may also be forwarded to the smartphone 814 in the case where there is no answer for a certain period. In this case, as long as the smartphone 814 is in the electromagnetic wave range of, for example, Wi-Fi (registered trademark), the user can hear a "notification sound" through the smartphone 814.

In the above-described embodiment, a recommended program can be notified to each user in a case where multiple users utilize one television apparatus 100 within a family.

Figure 5:
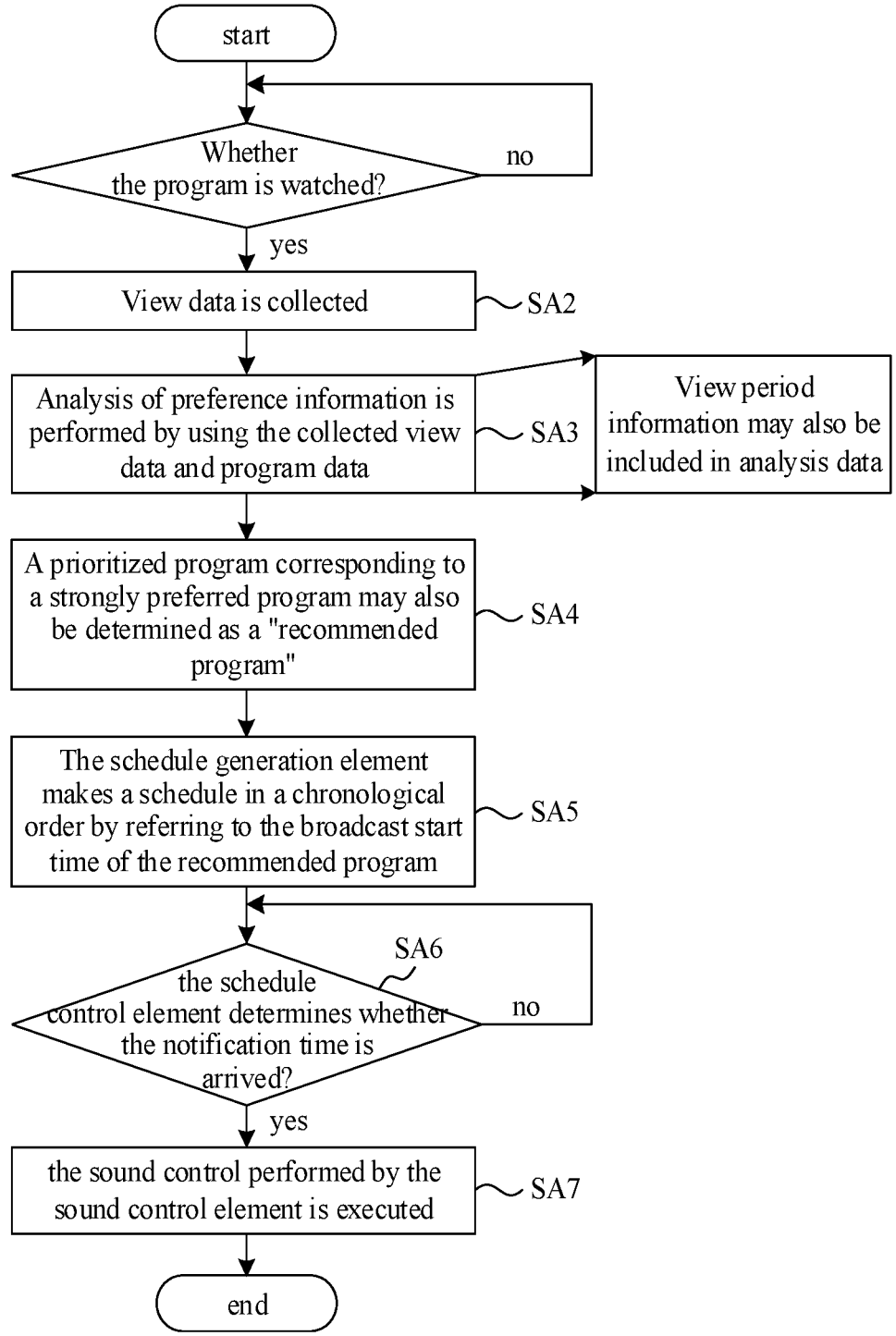
FIG. 5 is a flow chart illustrating an example of basic actions of an embodiment.

FIG. 5 is a flow chart illustrating the basic actions in the present system. In this figure, such content is shown as generating a schedule based on information of a program watched by a viewer and making schedule control. Whether the program is watched (SA1), view data is collected (SA2). Analysis of preference information is performed by using the collected view data and program data (SA3). View period information may also be included in analysis data (preference information). If the period information is included in the preference information, the present system may also determine the usage time of the television apparatus by the user.

After obtaining the parsing result of the preference information, the preference of the user or the television apparatus is known. It is determined whether or not second preference information, which is similar information to the first preference information indicating the preference, can be produced or extracted according to the program information of each program in the program data collection element 142. When it is determined that second preference information similar to the first preference information can be produced, programs corresponding to the second preference information become "recommended programs" or candidates for the "recommended programs". In a case where the number of "recommended programs" is large, a prioritized program corresponding to a strongly preferred program may also be determined as a "recommended program" (SA4).

Next, the schedule generation element makes a schedule in a chronological order by referring to the broadcast start time of the recommended program (SA5). The schedule control element determines whether the notification time is arrived (SA6)? The sound control performed by the sound control element is executed (SA7). The schedule control element outputs a notification instruction to the sound control element when the broadcast start time of the recommended program approaches so that the sound control element outputs a notification signal.

Figure 6:
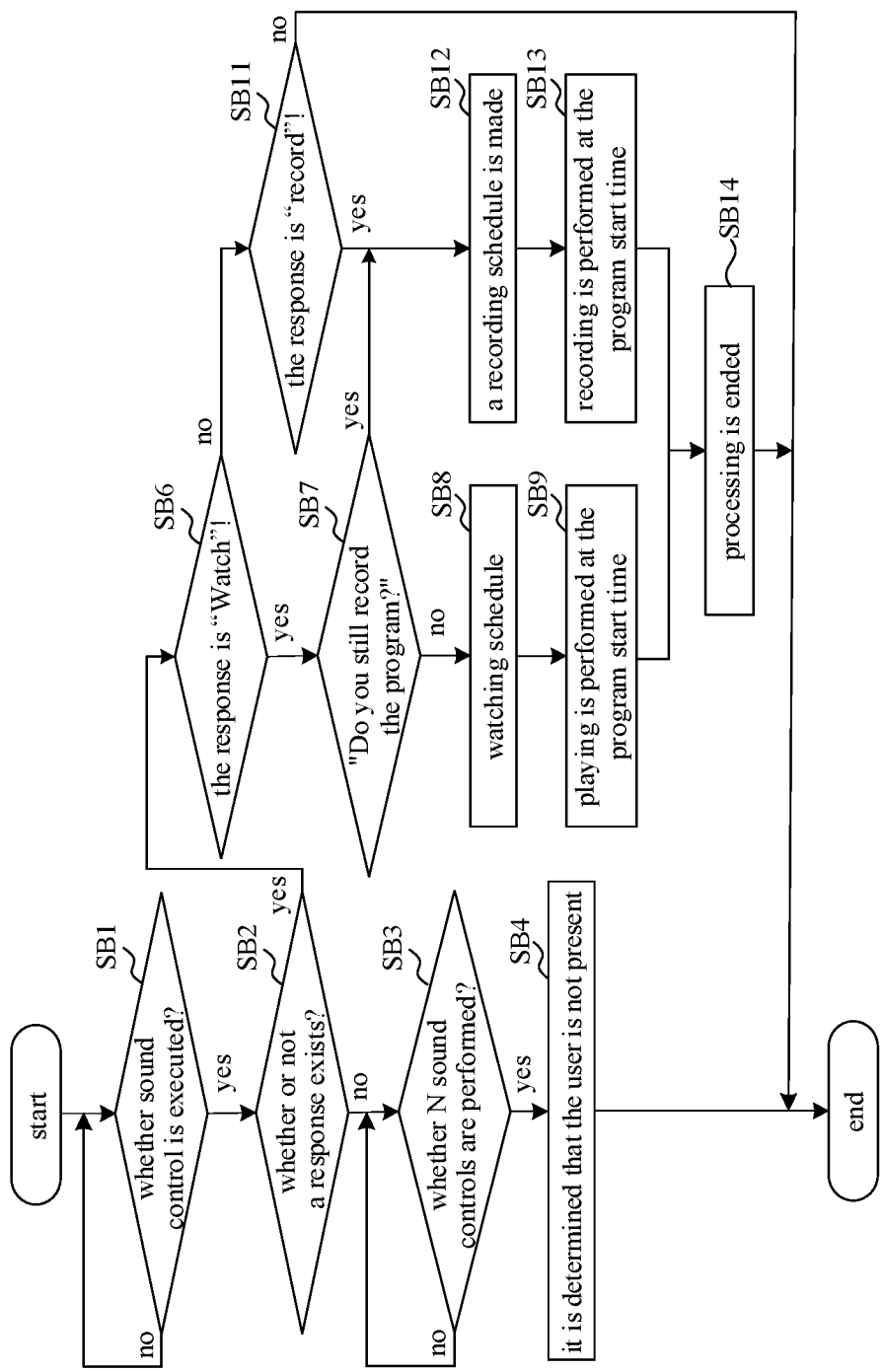
FIG. 6 is a flow chart illustrating an example of basic actions following the basic actions of FIG. 5.

FIG. 6 is a flowchart representing a process performed by the system of the present embodiment after the sound control described above is performed. The system makes a determination (SB1, SB2) whether or not a response exists after the sound control is performed by the sound control element 146. The system repeatedly performs multiple sound controls when there is no response (SB3), and determines that the user is not present (SB4) when the plurality of sound controls are performed and there is still no response, and ends the processing. When it is determined that there is a response from the user in step SB2, the content of the response is confirmed.

That is, if the response is "watch" or "switch the channel to a (recommended program)!" Then a "watching schedule" (SB8) is executed for receiving a "recommended program" that will start substantially in tens of seconds. In this case, the system may also ask "Do you still record the program?" (SB7). Here, if the user issues a response such as "still record the program" or "OK", a recording schedule is made (SB12), and a "watching schedule" (SB8) is followed.

With the two schedules, a watching schedule and a video recording schedule, are set, the system initiates "program play start" and "program recording start" at the start time of the program.

In the case where a response such as "watch" is not made in Step SB6, the system determines whether a response such as "watch" exists. In the case of such a response, a recording schedule of the "recommended program" is made (SB12), and recording is started at the start time of the program (SB13). In the absence of the response, the system ends the processing.

Figure 7:
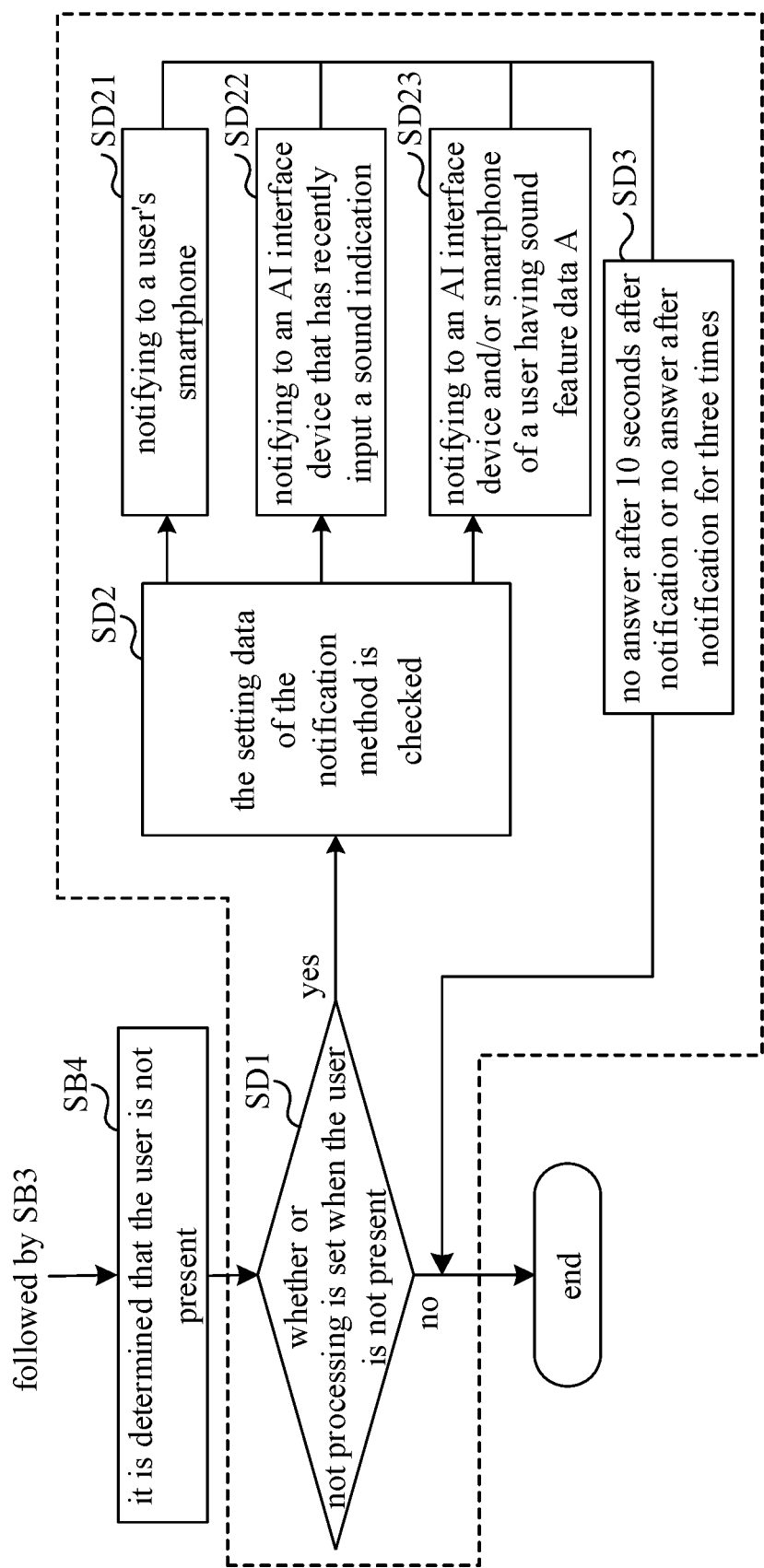
FIG. 7 is a flow chart illustrating a modification of the basic actions of FIG. 6.

FIG. 7 is a flowchart illustrating a modification of the basic actions of FIG. 6. Step SB3 and Step SB4 of FIG. 6 illustrate processing in a case of waiting for a response from a user after sound control is performed. In a case where the sound control is performed N times without receiving a response from the user, it is determined that the user is not present (SB4), and the processing is ended.

However, it is also possible to check the setting data of the notification method after determining that the user is not present (SB4). That is, following Step SB4, it is determined whether or not processing is set when the user is not present (SD1). As for the processing when the user is not present, first, for example, the setting data of the notification method is checked (SD2).

As for the processing when the user is not present, there is, for example, a method of notifying to a user's smartphone (SD21), a method of notifying to an AI interface device that has recently input a sound indication (SD22), or a method of notifying to an AI interface device and/or smartphone of a user having sound feature data A (SD23).

Steps SD21, SD22 are the methods illustrated in FIG. 4. The step SD23 is, for example, a method in which a specific person A is predetermined, and set to be sent with a notification at least, as a processing method when the user is not present.

Figure 8:
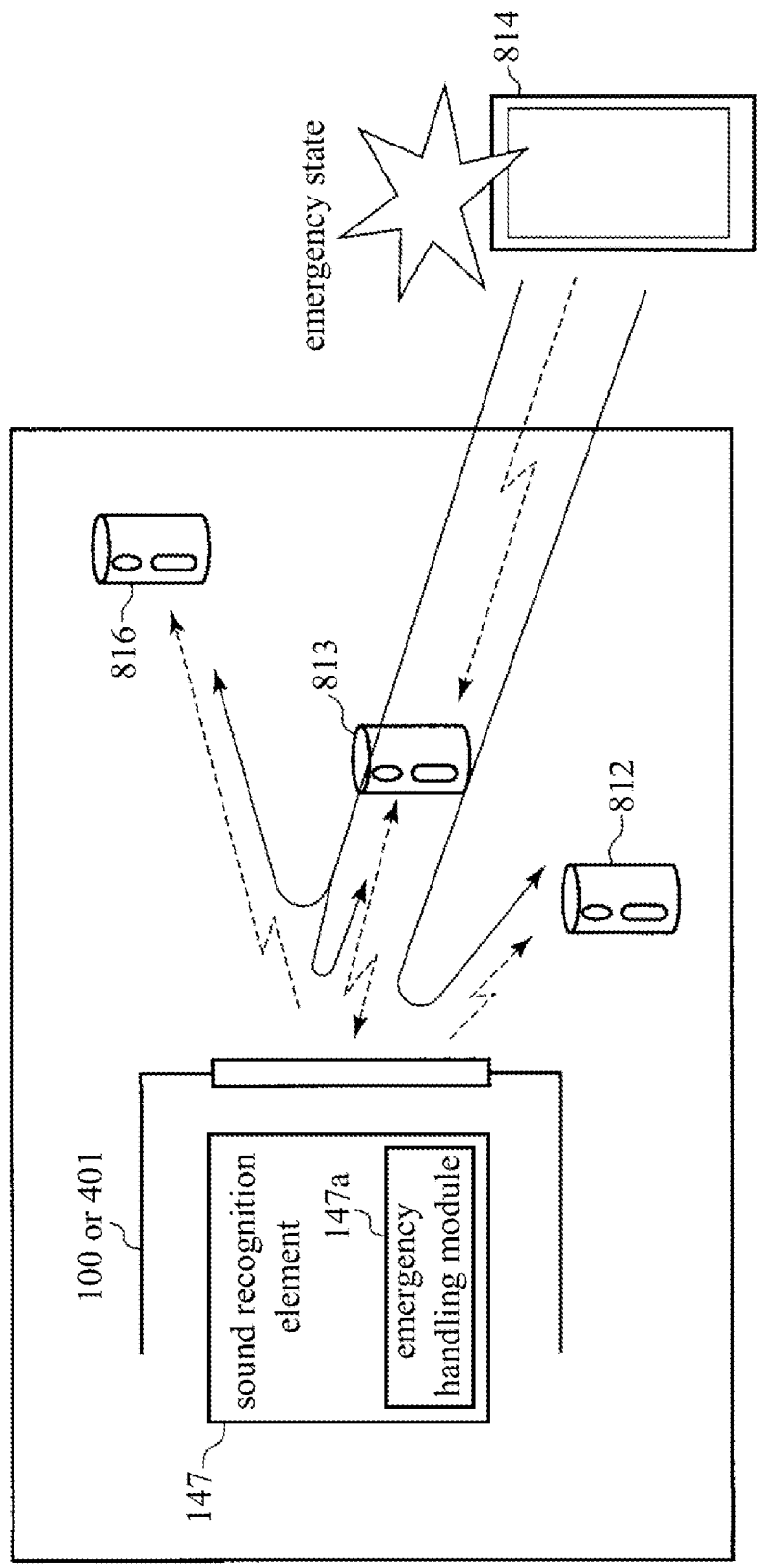
FIG. 8 is a diagram illustrating an example where an unusual or emergency period coping function is added by an option for the present embodiment.

FIG. 8 is an example of an unusual or emergency period coping function added by an option. An emergency handling module 147a may be added to the sound recognition element 147. For example, a specific sound (e.g., a sound output in an unusual period (e.g., asking for help or the like)) is determined in the smartphone 814 and registered in the sound recognition element 147. The sound recognition element 147 starts the emergency handling module 147a when it recognizes a sound output in the unusual period. In this case, the emergency handling module 147a is able to notify all of the AI interface devices 812, 813, 816 simultaneously with an "emergency notification sound" that the owner of the smartphone 814 is in the emergency period, thereby making a response.

In the embodiment described above, there is a function of parsing preference information and retrieving recommended programs for the user. However, there are also cases where there are multiple recommended programs and broadcast periods of the plurality of recommended programs overlap partially or wholly.

In view of the above issue, in the present system, a setting in advance is configured: as for a first type of program (e.g., a program with a low degree of preference), automatic recording is performed; as for a second type of program (e.g., a program with a high degree of preference), playing is performed. Alternatively, a function of setting, like automatically determining a program with a high degree of preference as a recommended program, may be provided, or a function of automatic determination of a recommended program with with a high degree of preference is provided if the function of setting is not configured. Device operation functions performed based on sound typically include an ASR (sound recognition element (convert sound to text) and NLU (Natural Language Understanding). A speaker determination function is typically a function of storing (learning) a sound of a user operating a device in advance, and determining whether it is the same person according to similarity to the sound. Alternatively, a design in which a user's sound is not learned in advance and the age range of the sound is estimated by using a feature component (e.g., a frequency component) of a sound instruction data is also considered. In this case, although it is difficult to determine an accurate age, it is possible to achieve such a control that the user is set as a watching restriction subject when it is noticeably a child's sound and the user is not set as a watching restriction subject when it is noticeably an adult's sound.

Figure 9:
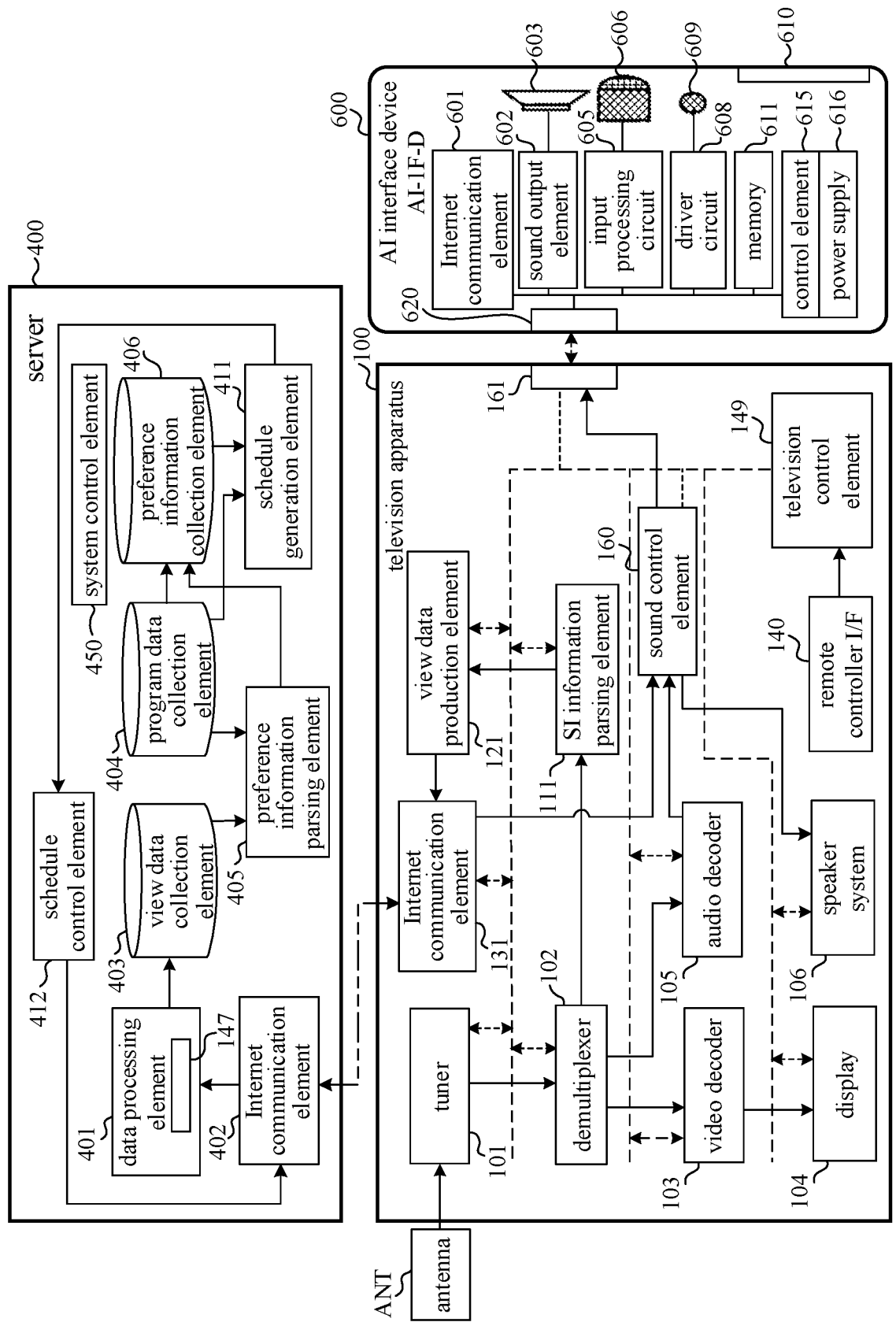
FIG. 9 is a block diagram illustrating another embodiment of the present disclosure.

FIG. 9 shows another embodiment of the present disclosure, the structure of which is similar to that shown in FIG. 2. Elements similar to those of FIG. 2 are labeled with the same numerals and description thereof is omitted. A element that differs from the structure of FIG. 2 is that sound control element 160 is able to receive a notification signal from the server 400.

The sound control element 160 can send a notification signal to the AI interface device 600 via the communication elements 161, 620 upon receipt of the notification signal. The communication elements 161, 620 are short range wireless communication elements such as Wi-Fi. Additionally, the sound control element 160 receives watching sound signals from an audio decoder 105 and outputs them to a speaker system 106. Therefore, the sound control element 160 is capable of performing the following control, at the time of input of a notification signal for generating a notification sound, the notification sound is output to allow a user to easily hear by controlling (restricting) the output level of the sound signal for watching. It should be noted that although it is illustrated that the communication element 161 communicates with the AI interface device 600, the sound control element 146 of FIG. 1 may be replaced if the speaker 603 illustrated in FIG. 1 is provided with a communication element.

Figure 10:
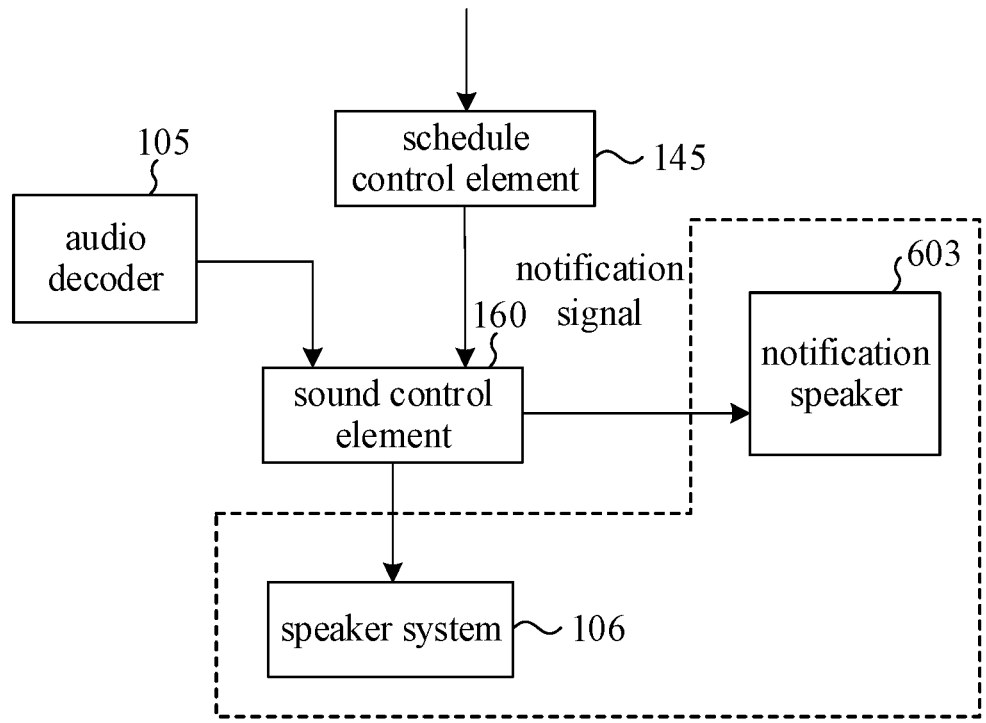
FIG. 10 is a block diagram illustrating main parts of the present disclosure.

FIG. 10 is a block diagram representing the main parts of the embodiment described above. According to an embodiment, there is provided with a schedule generation element 144 (or 411) that generates a schedule including a broadcast start time of a recommended program, wherein the recommended program is a program that is obtained by using view data of a program watched in a receiving apparatus and should be recommended to the receiving apparatus; a schedule control element 145 (or a schedule control element 412) that generates, on the basis of the schedule, a notification signal corresponding to the broadcast start time of the recommended program; and a sound control element 160 that controls output of a notification sound based on output of a watching sound for program watching and the notification signal. Also, the sound control element 160 outputs the notification sound separately from the watching sound or in a different sound field.

The sound control element 160 receives a watching sound signal for program watching from the audio decoder 105 and a notification signal from the schedule control 145, wherein the sound control element 160 is capable of outputting a notification sound to the notification speaker 603 and a watching signal to the speaker system 106.

Figure 11A:
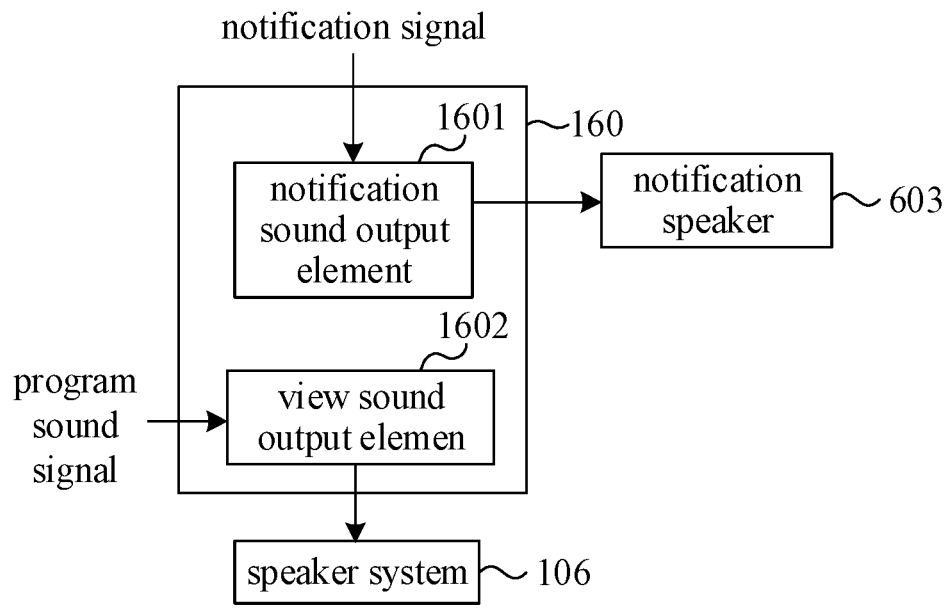
FIG. 11A is a diagram illustrating an example of functional blocks inside of a sound control element.

FIG. 11A illustrates an example of the basic function of the sound control element 160 described above. The sound control element 160 has a notification sound output element 1601 and a watching sound output element 1602, and the notification sound output element 1601 drives the notification speaker 603 in response to the notification signal. The watching sound output 1602 supplies watching sound signals from the audio decoder 105 to the speaker system 106.

Figure 11B:
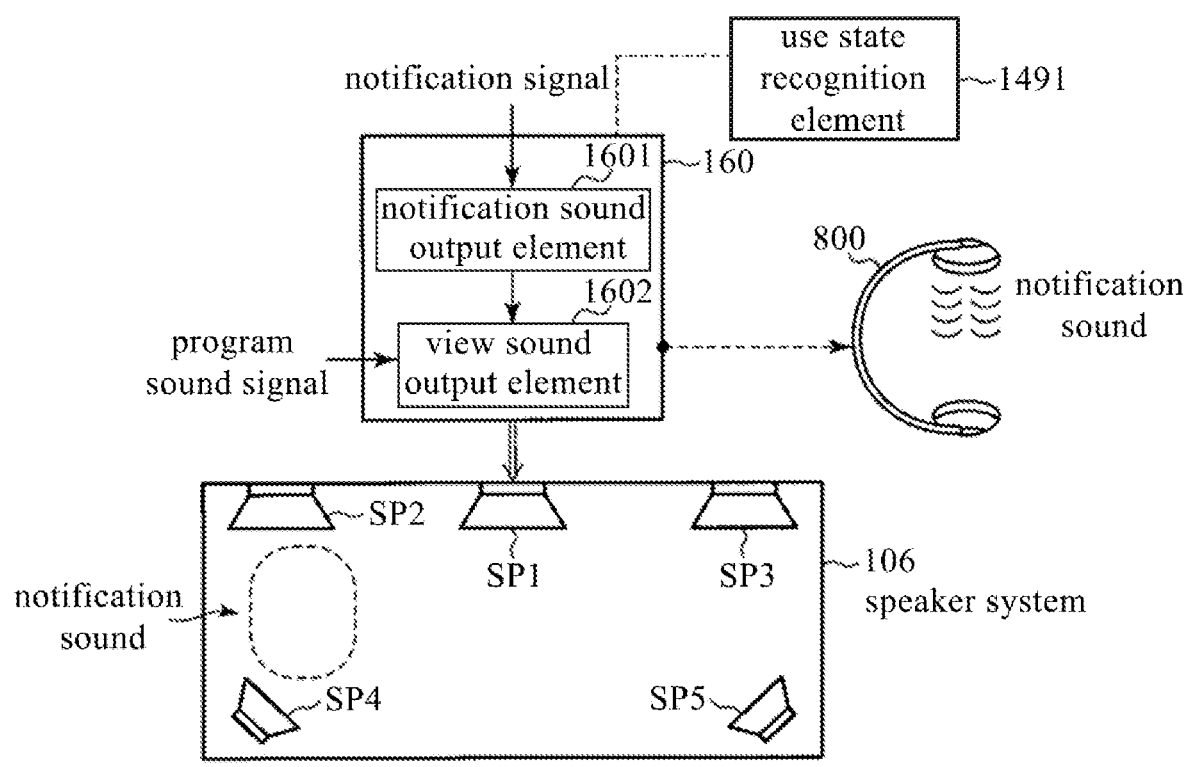
FIG. 11B is a diagram illustrating another example of the functional blocks inside the sound control element.

FIG. 11B illustrates a modification example of the structure in FIG. 11A. The notification sound output element 1601 controls the watching sound output element 1602 in response to the notification signal. Then, the watching sound output element 1602 forms a sound field for a notification sound by using a specific speaker or multiple specific speakers set in advance, from which a notification sound is output. Thus, the user can unambiguously recognize a notification sound that is different from the program watching sound.

Furthermore, when a headset 800 is used, the television control element 149 includes a device use state recognition element 1491 that recognizes that the headset 800 is being used. In this case, in a case where the notification sound output element 1601 responds to the notification signal, the watching sound output element 1602 can output a specific notification sound from, for example, a speaker on one side of the headset 800. The notification sound may also be a speech having a meaning. For example, the notification sound may be a speech such as "the recommend program starts right away."

According to the embodiments described above, the main points can be summarized as described below.

(A-1): As a whole point of view of the embodiments, the electronic apparatus having a notification function includes: a schedule generation element 144, 411 configured to generate a schedule including a broadcast start time of a recommended program, where the recommended program is a program determined by using view data of a program watched in a receiving apparatus and should be recommended to the receiving apparatus; a schedule control element 145, 412 configured to generate, based on the schedule, a notification signal corresponding to the broadcast start time of the recommended program; and a sound control element 146 configured to: based on output of the watching sound for program watching and the notification signal, control output of a notification sound in separation from a watching sound.

(A-2): The electronic apparatus having the notification function according to (A-1), the sound control element is configured to output the watching sound via a watching sound output element and output the notification sound via a notification sound output element.

(A-3) The electronic apparatus having the notification function according to (A-2), the sound control element is configured to take at least part of a plurality of watching sound output elements as the notification sound output element to perform action control.

(A-4) The electronic apparatus having the notification function according to (A-1), the electronic apparatus further includes a sound recognition element having a table including recognized sound of at least one user, and a schedule generated by the schedule generation element for each of the at least one user.

(A-5): The electronic apparatus having a notification function according to (A-4), the sound recognition element is configured to communicate with at least one AI interface device including a microphone for collecting sound and an output element of the notification sound, where the table further manages the AI interface device that should send the notification signal.

(A-6): The electronic apparatus having the notification function according to (A-1), the microphone is configured to collect an answer sound of the notification sound.

(B-1): As the television apparatus of FIG. 1, FIG. 2 includes elements of a server, a schedule generation element is provided. The schedule generation element is configured to generate a schedule including information of a recommended program that should be recommended to a receiving apparatus and a broadcast start time of the recommended program by using view data and program data of a program watched in the receiving apparatus and according to a result of preference information analysis. As the television apparatus of FIG. 1, FIG. 2 includes elements of a server, a schedule control element is also provided. The schedule control element is configured to output, on the basis of the schedule, a notification signal before the broadcast start time of the recommended program. The schedule control element controls, on the basis of the notification signal, a notification speaker used for outputting a notification sound. The notification speaker is arranged in a place differing from that of the main body of the receiving apparatus.

(B-2): The notification speaker outputs the notification sound at the different places. The schedule control element further reduces output of a sound of a program received by the receiving apparatus with respect to the notification speaker via a sound control element, whereby only the notification sound can be output. If this structure is arranged, the present system is able to output a notification sound only on, for example, one side of the headset to make the user unambiguously know that this is a notification of the "recommended program". Alternatively, if it is a multi-channel speaker system, the "notification sound" may also be localized to a prescribed location.

(B-3): As a notification speaker, an AI interface device (smart speaker) may be utilized. That is, the notification speaker is housed in a frame arranged in the different place, and a microphone for collecting a user's sound reply to the notification sound is also arranged in the frame. The user is able to move the notification speaker so that a "notification sound" can be reliably delivered to the user's residence.

(B-4): There are multiple notification speakers and users, as illustrated in FIG. 3B, the notification signal can be reliably sent to users' residences under independent management of the users and notification speakers.

(B-5): A scheme is described in which the receiving apparatus, the schedule generation element, and the schedule control element are arranged in the television apparatus (FIG. 1) or in the server connected to the Internet (FIG. 2), However, the receiving apparatus, the schedule generation element, and the schedule control element may be arranged in both of the television apparatus and the server described above, or may be selected to be arranged in either of them.

While several embodiments of the disclosure have been described, these embodiments are shown by way of example and are not intended to limit the scope of the disclosure. The embodiments may be embodied in a wide variety of other forms, and various omissions, substitutions and alterations may be made within the scope without departing from the spirit of the disclosure. These embodiments and variations thereof are included within the scope and spirit of the application, and within the scope of the disclosure recited in the claims and their equivalents. Furthermore, for each component of the claims, it is within the scope of the present disclosure when the components are expressed separately, multiple components together, or in combination. In addition, multiple embodiments may also be combined, and embodiments consisting of combinations thereof are also within the scope of the application. Further, the apparatus of the present disclosure is still applicable in the case where the claim is expressed as control logic, in the case where the claim is expressed as programs including instructions for causing a computer to execute, and in the case where the claim is expressed as a computer-readable storage medium in which the instructions are recorded. In addition, the names and terms used are not limited, and other expressions are included in the present disclosure as long as they are substantially the same content and the same subject matter.

What is claimed is:

1. An electronic apparatus having a notification function, comprising:
    a schedule generation element, configured to: generate a schedule comprising a broadcast start time of a recommended program, wherein the recommended program is determined by using view data of a program watched in a receiving apparatus and is recommended to the receiving apparatus;
    a schedule control element, configured to: generate a notification signal corresponding to the broadcast start time of the recommended program based on the schedule; and
    a sound control element, configured to: based on output of a watching sound for program watching and the notification signal, control output of a notification sound in a manner of separation from the watching sound;
    wherein the sound control element is configured to output he watching sound via a watching sound output element and output the notification sound via a notification sound output element;
    wherein the electronic apparatus further comprises:
    a sound recognition element having a table comprising recognized sound of at least one user, wherein a first schedule generated by the schedule generation element is for a first user of the at least one user;
    wherein the table further manages at least one AI interface device that sends the notification signal.

2. The electronic apparatus having the notification function according to claim 1, wherein the watching sound output element comprises a plurality of watching sound output elements;
    the sound control element is configured to take at least part of the plurality of watching sound output elements as the notification sound output element to perform action control.

3. The electronic apparatus having the notification function according to claim 1, wherein the sound recognition element is configured to communicate with the at least one AI interface device comprising a microphone for collecting sound and the notification sound output element.

4. The electronic apparatus having the notification function according to claim 3, wherein
    the microphone is configured to collect a reply sound of the notification sound output element.

5. The electronic apparatus having the notification function according to claim 1, wherein
    the sound control element is configured to restrict an output level of a sound signal for watching sound to allow a user to easily hear.

6. The electronic apparatus having the notification function according to claim 1, wherein the schedule comprises a schedule for recording and a schedule for watching.

7. The electronic apparatus having the notification function according to claim 1, wherein the recommended program comprises a plurality of recommended programs with different preference degrees, wherein broadcast periods of the plurality of recommended programs overlap partially or wholly, wherein the schedule control element is configured to:
    perform automatic recording for a first type of program with a low degree of preference, and perform playing for a second type of program with a high degree of preference.

8. A control method for an electronic apparatus having a notification function, comprising:
    generating a schedule comprising a broadcast start time of a recommended program, wherein the recommended program is determined by using view data of a program watched in a receiving apparatus and is recommended to the receiving apparatus;
    generating a notification signal corresponding to the broadcast start time of the recommended program based on the schedule; and
    controlling output of a notification sound in a manner of separation from a watching sound based on output of the watching sound for program watching and the notification signal;
    further comprising:
    outputting the notification sound via a notification sound output element;
    wherein a table configured in the electronic apparatus comprises recognized sound of at least one user, and a first schedule is for a first user of the at least one user;

wherein the table further manages at least one AI interface device that sends the notification signal.

9. The control method according to claim 8, wherein the watching sound output element comprises a plurality of watching sound output elements and the control method further comprises:

taking at least part of the plurality of watching sound output elements as the notification sound output element to perform action control.

10. The control method according to claim 8, further comprising:

communicating with the at least one AI interface device comprising a microphone for collecting sound and the notification sound output element.

11. The control method according to claim 8, further comprising:

collecting an reply sound of the notification sound output element.

12. The control method according to claim 8, further comprising:

restricting an output level of a sound signal for watching sound to allow a user to easily hear.

13. The control method according to claim 8, wherein the schedule comprises a schedule for recording and a schedule for watching.

14. The control method according to claim 8, wherein the recommended program comprises a plurality of recommended programs with different preference degrees, broadcast periods of the plurality of recommended programs overlap partially or wholly, and the control method further comprising:

performing automatic recording for a first type of program with a low degree of preference; and performing playing for a second type of program with a high degree of preference.

* * * * *